Jan. 23, 1962     F. R. BONHOMME     3,017,771
LIQUID LEVEL INDICATORS

Filed July 27, 1959                                        4 Sheets-Sheet 1

Jan. 23, 1962   F. R. BONHOMME   3,017,771
LIQUID LEVEL INDICATORS
Filed July 27, 1959   4 Sheets-Sheet 4

United States Patent Office 3,017,771
Patented Jan. 23, 1962

3,017,771
LIQUID LEVEL INDICATORS
Francois Robert Bonhomme, 337 Blvd. Saint-Denis,
Courbevoie, France
Filed July 27, 1959, Ser. No. 829,720
Claims priority, application France July 28, 1958
4 Claims. (Cl. 73—290)

The present invention relates to liquid level indicators including a detector apparatus and a motor for imparting vertical reciprocating movements to said device in a liquid tank, said motor being controlled by a device sensitive to variation of an electric parameter the value of which depends upon the distance of the detector apparatus from the level of the liquid surface in the tank, said device being capable alternately of causing said motor to lower said apparatus and, when said parameter reaches a predetermined critical value, of causing said motor to start an upward displacement of said apparatus, means being provided to indicate the position of said detector apparatus when said value is reached.

The object of the present invention is to provide a liquid level indicator of this kind which is better adapted to meet the requirements of practice than those used up to this time.

For this purpose, according to my invention, the device which controls said motor comprises a flexible diaphragm carried by said detector apparatus, electro-magnetic means for vibrating said diaphragm, means for deducing from the mechanical energy of said diaphragm an electrical energy varying in a general manner in proportion to said mechanical energy, and means for feeding said electrical energy to said electro-magnetic means, said device being responsive to variations of amplitude of the vibration of said diaphragm, which undergoes a sudden and great reduction when the diaphragm passes from a gaseous medium into a liquid.

Preferred embodiments of the present invention will be hereinafter described with reference to the accompanying drawings given merely by way of example and in which.

The object of the present invention is to indicate to a distance the position of the level N—N of the liquid in a tank 1.

Figure 1:
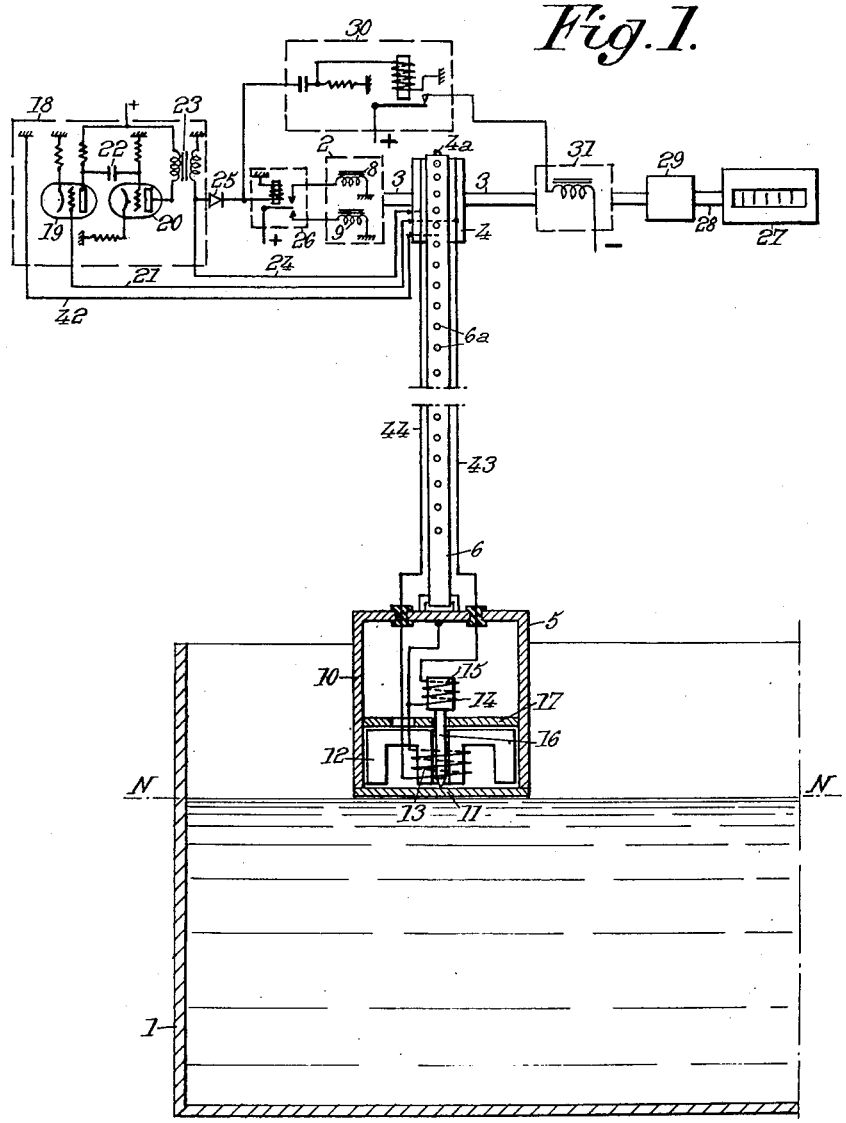
FIG. 1 is a diagrammatic elevational view, with parts in section, of a liquid level indicator made according to a first embodiment of the invention.
Figure 3:
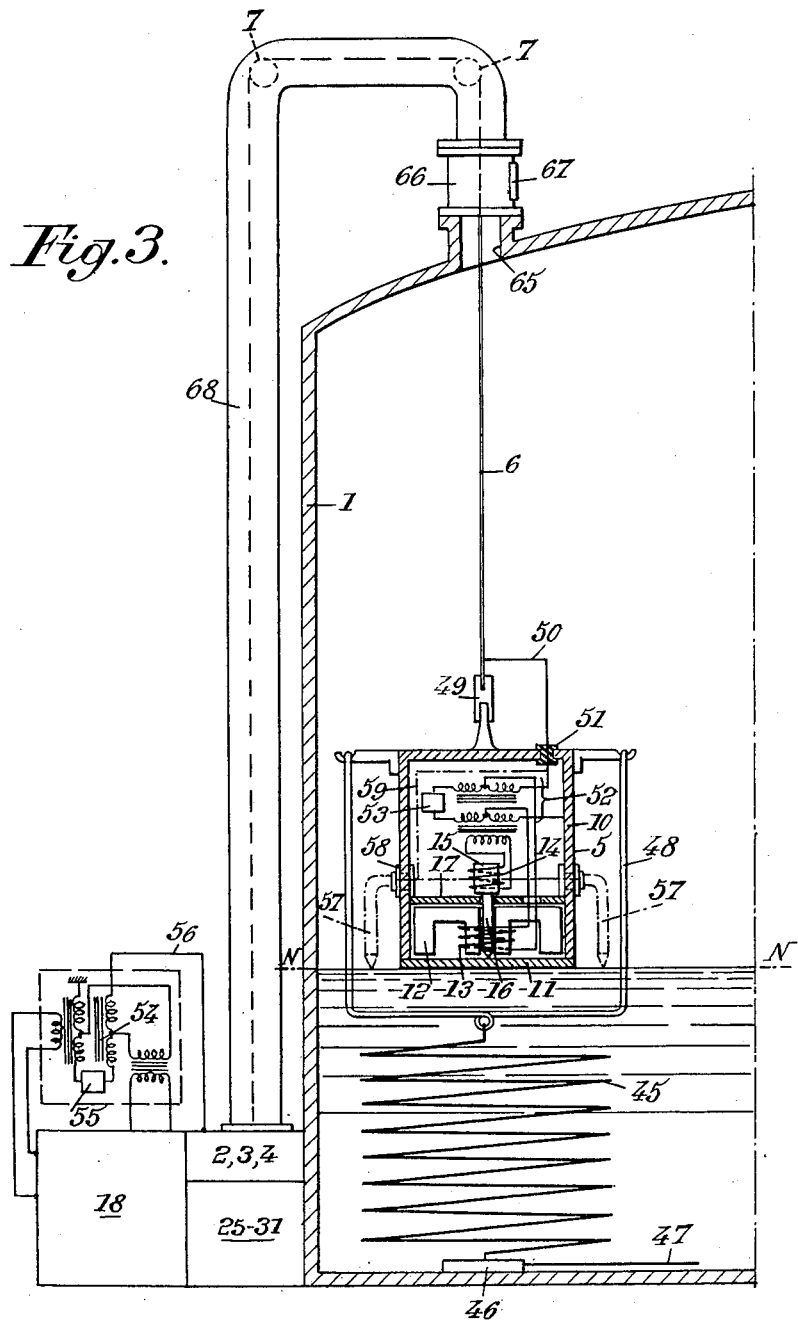
FIG. 3 shows, similarly to FIG. 1, a liquid level indicator made according to a second embodiment of the present invention.

As shown by FIG. 1, the liquid level indicator includes an electric motor 2 capable of driving in one direction or the other a shaft 3 on which is fixed a drum 4, the detector apparatus 5 being supported by a band or strip 6 passing around drum 4 by which it is driven without slipping. In the modification of FIG. 3, this band 6 passes on pulleys 7.

In order to avoid any slipping between drum 4 and band 6, the drum will be provided with teeth 4a and the band or strip with corresponding holes 6a.

The direction in which shaft 3 is rotated is determined by two windings 8 and 9 which correspond respectively to the downward movement and the upward movement of detector apparatus 5. Said windings are for instance the excitation windings of motor 2, but of course other arrangements might be used.

The detector apparatus 5 is located inside tank 1, whereas control means 2, 3, 4 and the visual means for indicating the liquid level are located on the outside of the tank. The means for controlling the position of apparatus 5 are located partly in said apparatus and partly close to the motor means.

According to the embodiment shown by FIG. 1, the detector apparatus includes a casing or box 10 having rigid walls of a non-magnetic material (preferably stainless steel) with the exception of its under wall which consists of a relatively flexible diaphragm 11 made, at least partly, of a ferromagnetic material (preferably a magnetic stainless steel). Casing 10 contains on the one hand an electro-magnetic having a laminated core 12 and a coil 13, fixed with respect to the casing and capable of vibrating diaphragm 11, and on the other hand an electro-magnetic generator capable of transforming the mechanical energy of the vibrations of said diaphragm into electrical energy. This generator consists of two elements, to wit a coil 14 and a permanent magnet 15 arranged in such manner that the displacements of the diaphragm produce variations of the inductor magnetic flux acting upon coil 14. For this purpose, one of said elements may be fixed with respect to casing 10 and the other is mechanically connected with the central portion of the diaphragm. In particular, as shown by FIG. 1, coil 14 is fixed and magnet 15 is connected with diaphragm 11 through a rod 16. In order to avoid any parasitic coupling between electro-magnet 12, 13 and generator 14, 15, these two devices are separated from each other by a metallic screen 17 which is grounded.

The indicator further includes an amplifier 18 located on the outside of tank 1 and which receives the current produced in coil 14, the output of this amplifier being connected to coil 13.

On FIG. 1, I have shown, by way of example, an amplifier 18 including two triodes 19 and 20. The lay-out is such that the current induced in coil 14 is transmitted, through a wire 21, to the grid of the first triode 19. The current thus amplified is applied through a condenser 22 serving to prevent the passage of direct current applied in the known manner to the anode of triode 19, to the grid of triode 20. The current amplified by this last mentioned triode is transmitted to coil 13, through a coupling transformer 23 and a wire 24.

The output current of transformer 23 is also transmitted, through a rectifier 25 (intended to transform this alternating current into a unidirectional current), to the excitation winding of a reversing relay 26 which, according as the voltage of its feed current is higher or lower than a given critical value, sends current either through coil 8 or through coil 9, respectively.

The means 27 for indicating the liquid level in tank 1 consists of a kind of counter which gives the angular position of drum 4 when the detector apparatus 10 comes into contact with the liquid level in said tank. Said indicating means 27 is graduated in distances of the level N—N above the bottom of tank 1.

It should be noted that the detector apparatus 10 stops at the end of its downward movement but not exactly at the time when diaphragm 11 comes into contact with the liquid, but a short time after this contact, due to the inertia of the whole.

I might make use of indicating means permanently connected with shaft 3 and arranged to indicate the angular position of this shaft when the vertical movement of casing 10 is reversed, account being taken of the time of response due to inertia.

However it seems more advantageous, as indicated by the drawing, to interpose between shaft 3 and the shaft 28 of the indicating means 27 a kind of clutch 29 such that normally the two shafts are not coupled together but arranged to couple them with each other exactly at the time when the current from the output of amplifier 18 drops suddenly due to the coming into contact of the diaphragm with the liquid. The clutch keeps shafts 3 and 28 coupled together for the time necessary to the reading of the indications on means 27, and immediately after this the shafts cease to be coupled together.

For this purpose, I connect across relay 26 a relay 30 having a suitable time constant and capable, when it is energized, of feeding current to the electro-magnet 31 which causes the engagement of clutch 29 (through which shafts 3 and 28 are coupled together) and which, in the state of rest, cuts off the feed of current to said electro-magnet 31 (so that there is no coupling between said shafts 3 and 28).

Figure 2:
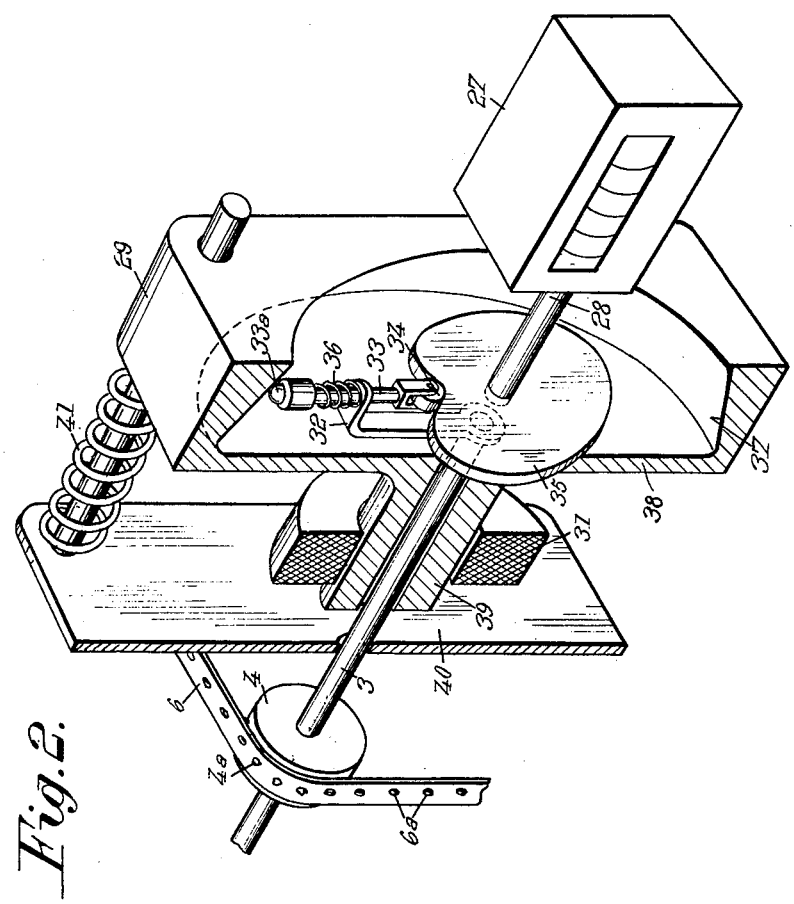
FIG. 2 shows, on an enlarged scale, in perspective view with parts cut away, a detail of the liquid level indicator of FIG. 1.

FIG. 2 shows, by way of example, a construction of such a clutch. On a support 32, rigid with the shaft 3, is slidably mounted a push-piece 33 which carries at its end a roller 34 adapted to run along a heart-shaped cam 35 rigid with shaft 28. The other end of push-piece 33 carries a ball 33a which is kept by a spring 36 applied against a substantially frusto-conical surface 37 carried by a disc 38. This disc 38 is rigid with a core 39 inserted in electro-magnet 31, which is fixed with respect to the frame 40 of the clutch. This core is urged by springs 41 in the direction which enables push-piece 33 to move away from cam 35 while remaining in contact with surface 37 through ball 33a.

The liquid level indicator according to my invention works as follows:

Let it be supposed that detector apparatus 5 is initially at some distance above the level N—N of the liquid in tank 1. Diaphragm 11, being not in contact with the liquid, is caused to vibrate with an amplitude and therefore an energy sufficient to enable the current leaving transformer 23 and fed to coil 13 to maintain the vibration of said diaphragm. The current, after passage through rectifier 25, energizes the coil of relay 26 and passes through coil 8 so that drum 4 is rotated in the direction correpsonding to the downward movement of detector apparatus 5.

At the end of this downward movement, diaphragm 11 comes into contact with the surface N—N of the liquid, which immediately and considerably reduces the amplitude of its vibration so that the energy it can give off drops below the critical value for which the vibration is maintained. The current supplied at the output of transformer 23 becomes practically zero so that the coil of relay 26 ceases to be fed with current, thus cutting off the connection with coil 8. The downward movement of detector apparatus 5 is stopped and the indicating means 27 give a reading corresponding to the level of the liquid in tank 1. Then, coil 9 is fed with current and detector apparatus 5 starts moving upwardly. As soon as diaphragm 11 comes out from the liquid, its movement ceases to be damped and the conditions for vibration thereof are restored so that relay 26 is once more reversed and the cycle above described begins again with a period depending upon the mechanical characteristics of the system.

When the detector apparatus 5 (FIG. 1) moves in the downward direction, the unidirectional current at the output of rectifier 25 does not act upon relay 30 because a capacitor is interposed between said rectifier and the winding of relay 30. Electro-magnet 31 is therefore at rest. Spring 41 keeps disc 38 in the position which permits the roller 34 of push-piece 33 to be out of contact with cam 35, so that shafts 3 and 28 are not coupled together. When diaphragm 11 (FIG. 1) comes into contact with the liquid in the tank, relay 26 ceases to be fed with current, as above explained, and the break impulse caused by the interruption of current at the output of rectifier is transmitted through the capacitor to the winding of relay 30, which is energized for a short time and closes the contact capable of feeding current to electromagnet 31. Push-piece 33, is applied against cam 35, the reaction of the roller thereon having for its effect to rotate cam 35 until the angular offsetting of said shaft 28 with respect to shaft 3 (position shown by FIG. 2) is eliminated. Shafts 3 and 28 remain coupled together only for a time depending upon the time constant of relay 30 and during which the height of liquid level N—N is indicated by device 27. Advantageously, abutments are provided between shafts 3 and 28 to limit said angular offsetting to a value (corresponding approximately to 90°) such that this offsetting can be eliminated by the action of push-piece 33 and of cam 35.

If the level of the liquid in the tank keeps varying, the detector apparatus 5 comes into contact with the liquid at a different height on every cycle of operation, this height being every time indicated by system 27 due to the action of clutch 29.

Thus the mechanism for driving band 6 is constantly in movement, which prevents the moving pieces and in particular the pulleys 7 from wedging due to corrosion or clogging as would occur in particular if the tank contains a petroleum product.

The embodiment illustrated by FIG. 1 requires the provision, between apparatus 5 and amplifier 18, of three conductors, respectively connected with wires 21 and 24 and grounding wire 42. These three conductors may be constituted, in this case, by band 6 itself which is made for this purpose of a flexible conductor material and is electrically connected with casing 10, for connection with the grounding wire 42, and by two wires 43 and 44 carried by band 6 and insulated therefrom, for connection with the wires 21 and 24. Of course, drum 4 must be arranged in such manner as to establish an electric continuity between wires to be connected together.

I may substitute for one of the wires 43 or 44 carried by band 6 a flexible conductor 45 (FIG. 3) in the form of a spiral spring, electrically connected to casing 10 on the one hand and to the bottom of tank 1 on the other hand, band 6 being then insulated from the ground. If conductor 45 cannot be electrically connected in a suitable manner with the mass of tank 1, it can easily be connected with a heavy piece 46 capable of keeping its lower end at the bottom of the tank, this lower end being grounded through a fixed conductor 47. In order to permit free operation of diaphragm 11, the spring has its upper end connected with a kind of stirrup 48 fixed at the upper portion of casing 10.

When band 6 is used as a conductor other than that leading to the grounding wire, it should be insulated from the casing by means of an insulating piece 49 and connected with the inside of the casing by a conductor 50 passing through a fluidtight insulating piece 51. Of course, all the other elements that may be in contact with band 6, and in particular pulleys 7, must also be insulated from the ground.

The whole system may be simplified by passing through the same conductor the low voltage current induced in coil 14 and transmitted to the input of amplifier 18 and the high voltage current leaving the amplifier and transmitted to coil 13.

By way of example, I have shown on FIG. 3 an arrangement for this purpose. It includes essentially a first differential transformer 52 balanced by an impedance 53 and located in casing 10 and a second differential transformer 54, balanced by an impedance 55 and located close to amplifier 18, these two differential transformers being connected by conductor 50 and a single conductor 56 playing the part of the two conductor wires 21 and 24 of FIG. 1.

The construction of transformers 52 and 54 (according to an arrangement well known in the art, in particular for telephonic circuits) is such that the input of amplifier 18 is not perturbed and receives only the voltage of generator 14, but that the output energy of amplifier 18 is truly transmitted to coil 13 without perturbing coil 14. Such an arrangement permits, as shown by FIG. 3, of using as conductors only band 6 and spring 45.

The detector above described may easily be completed to indicate, in addition to a level of separation between a liquid and a gas, the level of separation between two liquid phases, to wit an upper liquid phase which is not a conductor of electricity and a lower liquid phase which is a conductor of electricity. This is the case in particular in tanks for petroleum products, the upper liquid phase being constituted by such products and the lower liquid phase by water.

In this case, it suffices to provide casing 10 with two conductor points 57 (FIGS. 3 and 4) separated from casing 10 by insulating plugs 58 and connected, through a conductor 59, to band 6 when said band is not normally grounded (FIG. 3) or to one of the wires 21 and 24 in the other case (FIG. 1). Furthermore, means are provided for keeping at will relay 26 in the downward movement position (feed of coil 8) and relay 30 in the position corresponding to the release of clutch 29 as long as band 6 (FIG. 3) or one of the wires 21 and 24 (FIG. 1) is not grounded through points 57 and the electricity conducting liquid phase and for reversing the position of said relays as soon as said elements are grounded.

Owing to this arrangement, the detector apparatus 5 can be immersed in the upper liquid phase which is not a conductor of electricity until it comes at the level of the surface of the lower liquid phase which is a conductor of electricity, the height of this level being read on the indicating means 27.

Figure 4:
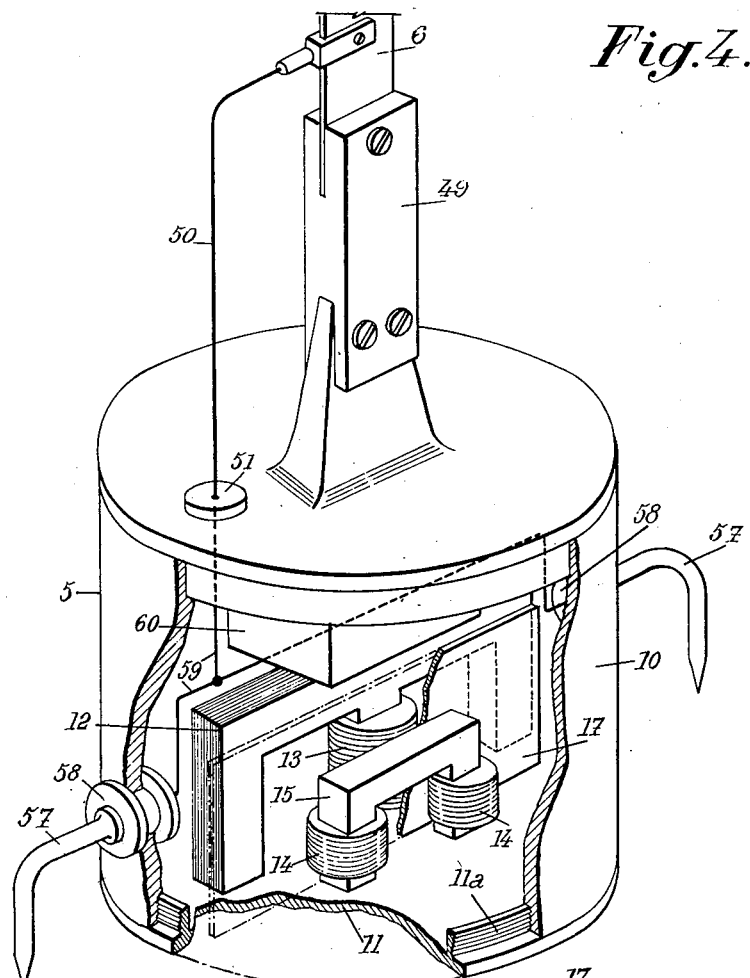
FIG. 4 shows, on an enlarged scale, in perspective view with parts cut away, the detail of the construction of the detector apparatus of FIGS. 1 and 3.
Figure 5:
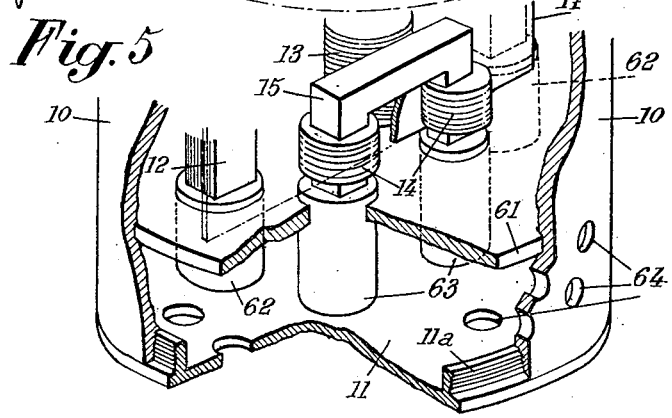
FIG. 5 shows a modification of the lower portion of FIG. 4.

FIG. 4 shows how the various elements of the detector apparatus 5 of FIG. 3 can be housed inside casing 10, which is closed at its bottom end by diaphragm 11 which is fixed by screwing by means of a threaded edge 11a. The electro-magnet core 12 has the shape of an E and it carries coil 13 upon its middle bar whereas magnet 15 is U-shaped and is fixed with respect to casing 10, the variations of the gap between diaphragm 11 and the ends of magnet 15 determining the variations of hte inductor magnetic flux in coil 14 which is also fixed with respect to casing 10. Core 12, magnet 15 and screen 17 are disposed vertically. The differential transformer 52 is disposed in a casing 60 which is fixed to the upper plate of casing 10.

The detector of FIG. 4 is intended to work in tanks in communication with the outside or when the pressure is very low. When a high pressure exists in the tank, it is necessary to balance the effects of the pressures on the opposed faces of diaphragm 11. For this purpose, I make use of a diaphragm 11 which does not constitute a fluidtight partition and above which is mounted a plate 61 rigid and fluidtight, this plate being made of non-magnetic stainless steel of sufficient thickness to be able to withstand the pressures in the tank. Through this plate 61 extend in fluidtight fashion welded pieces 62 and 63 extending as far as diaphragm 11, pieces 62 forming an extension of the magnetic circuit of electro-magnet 12, 13 and pieces 63 of generator 14, 15. Diaphragm 11 and the portion of casing 10 located below plate 61 are provided with holes 64 for the passage of the liquid so that the upper face of the diaphragm has not its displacements damped by stationary liquid located above it.

The indicator according to the present invention can be placed and used in a tank without emptying or degassing this tank, even in the case of a tank under pressure such as shown by FIG. 3. For the sake of clarity of the drawing, the dimensions of the detector apparatus 5 have been greatly enlarged with respect to those of tank 1 and in particular of the man-hole 65. It can easily be understood that the apparatus 5, spring 45 and the weight 46 can easily be introduced through man-hole 65, the grounding conductor 47 being introduced through another man-hole. For the upkeep of the system, it is useful to provide a section 66 provided with a gate 67, so that it is possible to replace the detector apparatus 5 in case of breakdown. Beyond this section 66 there is provided a tube 68, containing band 6 and the pulleys 7, leading to the external portion of the apparatus.

When it is desired to determine the level of some hydrocarbons, the detector apparatus should be placed in a tube disposed inside tank 1. These products, which are insulating, carry important electrostatic charges and might, in some conditions, give rise to discharges between the detector which is at the ground potential. Said tube evacuates said charges and eliminates the risks of producing discharges.

Among the advantages of the indicator above described, I may cite:

The resistance to intensive corrosion;
The possibility of working despite a clogging due to various deposits and in particular conductor deposits;
The possibility of working in liquid products of all kinds;
The anti-deflagration properties;
The possibility of working at very high pressures, of the order of 20 kg./sq. cm.;
The facilities for upkeep and replacements;
The fact that the detector is sufficiently small to pass through a man-hole.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A liquid level indicator which comprises, in combination, a liquid tight closed casing movable vertically with respect to the liquid level, said casing having a rigid portion and a deformable portion, this deformable portion being a horizontal end wall of said casing forming a diaphragm capable of vibrating in a gaseous medium but undergoing a sudden and great reduction of amplitude of vibration when it passes from a gaseous medium to a liquid medium, electro-magnetic means in said casing for vibrating said diaphragm, said electro-magnetic means comprising an electro-magnet carried by said rigid portion in the immediate vicinity of said diaphragm to act thereon, said diaphragm being made of a ferro-magnetic material, a grounded metallic screen mounted in said casing on the other side of said electro-magnet from said diaphragm, means for deducing from the mechanical energy of said vibrating diaphragm an electrical energy varying in accordance with variations of the amplitude of vibration of said diaphragm, said last mentioned means including on the one hand an electro-magnetic generator located wholly inside said casing on the other side of said screen from said electro-magnet, said generator having a magnetic circuit element and an electric circuit element, one of said elements being fixed with respect to said casing rigid portion and the other one being movable with respect to said rigid portion and mechanically connected with the central zone of said diaphragm and on the other hand an amplifier electrically connected with the electric circuit element of said generator and located on the outside of said casing at a fixed level, means for feeding said electrical energy to said electro-magnetic means to vibrate said diaphragm, a reversible electric motor for moving said casing vertically, means operative in response to the production of said electrical energy from said diaphragm vibrating in a gaseous medium for operating said motor in the direction which moves said casing downwardly, means operative in response to the drop of said electrical energy due to the passage of said diaphragm into the liquid for operating said motor in the opposed direction, and means for indicating the position of said apparatus as its vertical movement is reversed from downward to upward.

2. A liquid level indicator according to claim 1 in which said indicating means include a shaft, means for indicating the angular position of said shaft, and clutch means operative in response to the reversing of the downward movement of said detector apparatus for temporarily bringing said shaft in predetermined angular relation to the shaft of said motor.

3. A liquid level indicator according to claim 2 in which said clutch means are operative in response to the sudden reduction of vibration amplitude of said diaphragm.

4. In a liquid level indicating system, a detector apparatus which comprises, in combination, a liquidtight closed casing movable vertically with respect to the liquid level, said casing having a rigid portion and a deformable portion, this deformable portion being a horizontal end wall of said casing forming a diaphragm capable of vibrating with a substantial amplitude in a gaseous medium but undergoing a sudden and great reduction of amplitude when it passes from a gaseous medium to a liquid medium, electro-magnetic means in said casing for vibrating said diaphragm, said electro-magnetic means comprising an electro-magnet carried by said rigid portion in the immediate vicinity of said diaphragm to act thereon, said diaphragm being made of a ferro-magnetic material, an electro-magnetic generator located wholly in said casing on the other side of said electro-magnet from said diaphragm, said generator having a magnetic circuit element and an electric circuit element, one of said elements being fixed with respect to said rigid portion and the other one being movable with respect to said rigid portion, means for mechanically connecting said last mentioned generator element with the central zone of said diaphragm, screening means interposed between said electro-magnet and said generator to prevent parasitic coupling between said electro-magnet and said generator, means for feeding electrical energy to said electro-magnetic means to vibrate said diaphragm and means for collecting from said electro-magnetic generator an electrical energy which is different according as said diaphragm is in a gaseous medium or is in contact with a liquid, whereby the sudden variation of said last mentioned electrical energy is indicative of the position, in the vertical direction, of said casing with respect to the liquid level.

References Cited in the file of this patent
UNITED STATES PATENTS

| | | |
|---|---|---|
| 2,283,429 | Ennis | May 19, 1942 |
| 2,326,033 | Hutcheson | Aug. 3, 1943 |
| 2,472,249 | De Giers et al. | June 7, 1949 |
| 2,545,467 | Jeanlin | Mar. 20, 1951 |
| 2,787,759 | Arps | Apr. 2, 1957 |
| 2,808,581 | Findlay | Oct. 1, 1957 |